United States Patent
Oberheide et al.

(10) Patent No.: US 9,338,156 B2
(45) Date of Patent: May 10, 2016

(54) SYSTEM AND METHOD FOR INTEGRATING TWO-FACTOR AUTHENTICATION IN A DEVICE

(71) Applicant: Duo Security, Inc., Ann Arbor, MI (US)

(72) Inventors: Jon Oberheide, Ann Arbor, MI (US); Douglas Song, Ann Arbor, MI (US)

(73) Assignee: Duo Security, Inc., Ann Arbor, MI (US)

( * ) Notice: Subject to any disclaimer, the term of this patent is extended or adjusted under 35 U.S.C. 154(b) by 0 days.

(21) Appl. No.: 14/188,480

(22) Filed: Feb. 24, 2014

(65) Prior Publication Data

US 2014/0245396 A1    Aug. 28, 2014

Related U.S. Application Data

(60) Provisional application No. 61/768,248, filed on Feb. 22, 2013.

(51) Int. Cl.
| | |
|---|---|
| *G06F 21/00* | (2013.01) |
| *H04L 29/06* | (2006.01) |
| *H04W 12/06* | (2009.01) |
| *G06F 21/40* | (2013.01) |

(52) U.S. Cl.
CPC ............... *H04L 63/08* (2013.01); *G06F 21/40* (2013.01); *H04L 63/18* (2013.01); *H04W 12/06* (2013.01); *H04L 63/0853* (2013.01); *H04L 2463/082* (2013.01)

(58) Field of Classification Search
CPC ................................................ H04L 2463/082
USPC ......................................................... 713/182
See application file for complete search history.

(56) References Cited

U.S. PATENT DOCUMENTS

| | | | |
|---|---|---|---|
| 5,838,792 | A | 11/1998 | Ganesan |
| 5,870,723 | A | 2/1999 | Pare et al. |
| 6,119,096 | A | 9/2000 | Mann et al. |
| 6,694,025 | B1 | 2/2004 | Epstein et al. |
| 6,758,394 | B2 | 7/2004 | Maskatiya et al. |
| 6,823,359 | B1 | 11/2004 | Heidingsfeld et al. |
| 6,934,858 | B2 | 8/2005 | Woodhill |
| 6,956,950 | B2 | 10/2005 | Kausik |
| 7,096,354 | B2 | 8/2006 | Wheeler et al. |
| 7,447,784 | B2 | 11/2008 | Eun |

(Continued)

OTHER PUBLICATIONS

Simske et al., "APEX: Automated Policy Enforcement eXchange", Sep. 21-24, 2010, ACM, pp. 139-142.

(Continued)

*Primary Examiner* — Christopher Brown
(74) *Attorney, Agent, or Firm* — Jeffrey Schox; Thomas Gwinn

(57) ABSTRACT

A system and method for providing secondary-factor authentication with a third party application that can include enrolling a device application instance of an account into a secondary-factor authentication service on behalf of a service provider that includes at the secondary-factor authentication service, receiving a secondary factor of authentication enrollment request of an account, the request received from the service provider, transmitting an activation code, and pairing the device application instance with the account through the activation code; receiving an authentication request identifying the account; transmitting an authentication request to the device application instance paired with the account; validating a response to the application request; and transmitting an assessment to the service provider.

9 Claims, 14 Drawing Sheets

(56) References Cited

U.S. PATENT DOCUMENTS

| | | |
|---|---|---|
| 7,463,637 B2 | 12/2008 | Bou-Diab et al. |
| 7,526,792 B2 | 4/2009 | Ross |
| 7,574,733 B2 | 8/2009 | Woodhill |
| 7,982,595 B2 | 7/2011 | Hanna et al. |
| 8,136,148 B1 | 3/2012 | Chayanam et al. |
| 8,161,527 B2 * | 4/2012 | Curren .............................. 726/2 |
| 8,200,980 B1 | 6/2012 | Robinson et al. |
| 8,245,044 B2 | 8/2012 | Kang |
| 8,332,627 B1 | 12/2012 | Matthews et al. |
| 8,335,933 B2 | 12/2012 | Humphrey et al. |
| 8,397,301 B2 | 3/2013 | Hering et al. |
| 8,402,526 B2 | 3/2013 | Ahn |
| 8,458,798 B2 | 6/2013 | Williams et al. |
| 8,495,720 B2 | 7/2013 | Counterman |
| 8,499,339 B2 | 7/2013 | Chao et al. |
| 8,538,028 B2 | 9/2013 | Yeap et al. |
| 8,627,438 B1 | 1/2014 | Bhimanaik |
| 8,646,086 B2 | 2/2014 | Chakra et al. |
| 8,700,729 B2 | 4/2014 | Dua |
| 8,732,475 B2 | 5/2014 | Fahrny et al. |
| 8,732,839 B2 | 5/2014 | Hohl |
| 8,763,077 B2 | 6/2014 | Oberheide et al. |
| 8,898,762 B2 | 11/2014 | Kang |
| 2002/0123967 A1 | 9/2002 | Wang |
| 2003/0115452 A1 | 6/2003 | Sandhu et al. |
| 2003/0126472 A1 | 7/2003 | Banzhof |
| 2003/0147536 A1 | 8/2003 | Andivahis et al. |
| 2005/0218215 A1 | 10/2005 | Lauden |
| 2005/0221268 A1 | 10/2005 | Chaar et al. |
| 2005/0268107 A1 | 12/2005 | Harris et al. |
| 2006/0130139 A1 | 6/2006 | Sobel et al. |
| 2006/0165060 A1 | 7/2006 | Dua |
| 2006/0182276 A1 | 8/2006 | Sandhu et al. |
| 2006/0242692 A1 | 10/2006 | Thione et al. |
| 2007/0199060 A1 | 8/2007 | Touboul |
| 2007/0228148 A1 | 10/2007 | Rable |
| 2007/0250914 A1 | 10/2007 | Fazal |
| 2007/0284429 A1 | 12/2007 | Beeman |
| 2008/0049642 A1 | 2/2008 | Gudipudi et al. |
| 2009/0055906 A1 | 2/2009 | Wendorff |
| 2009/0187986 A1 | 7/2009 | Ozeki |
| 2009/0300707 A1 | 12/2009 | Garimella et al. |
| 2010/0042954 A1 | 2/2010 | Rosenblatt et al. |
| 2010/0069104 A1 | 3/2010 | Neil et al. |
| 2010/0114740 A1 | 5/2010 | Dominguez et al. |
| 2010/0115578 A1 | 5/2010 | Nice et al. |
| 2010/0121767 A1 | 5/2010 | Coulter et al. |
| 2010/0125737 A1 | 5/2010 | Kang |
| 2010/0180001 A1 | 7/2010 | Hardt |
| 2010/0202609 A1 | 8/2010 | Sandhu et al. |
| 2010/0216425 A1 | 8/2010 | Smith |
| 2010/0217986 A1 | 8/2010 | Schneider |
| 2010/0233996 A1 | 9/2010 | Herz et al. |
| 2010/0330969 A1 | 12/2010 | Kim et al. |
| 2011/0086616 A1 * | 4/2011 | Brand et al. ................... 455/411 |
| 2011/0138469 A1 | 6/2011 | Ye et al. |
| 2011/0197267 A1 * | 8/2011 | Gravel et al. ...................... 726/5 |
| 2011/0219449 A1 | 9/2011 | St. Neitzel et al. |
| 2011/0277025 A1 | 11/2011 | Counterman |
| 2011/0302410 A1 | 12/2011 | Clarke et al. |
| 2011/0302630 A1 | 12/2011 | Nair et al. |
| 2012/0090028 A1 | 4/2012 | Lapsley et al. |
| 2012/0096274 A1 | 4/2012 | Campagna et al. |
| 2012/0198050 A1 | 8/2012 | Maki et al. |
| 2012/0216239 A1 | 8/2012 | Yadav et al. |
| 2012/0300931 A1 | 11/2012 | Ollikainen et al. |
| 2013/0042002 A1 | 2/2013 | Cheeniyil et al. |
| 2013/0081101 A1 | 3/2013 | Baer et al. |
| 2013/0097585 A1 | 4/2013 | Jentsch et al. |
| 2013/0110676 A1 * | 5/2013 | Kobres ....................... 705/26.41 |
| 2013/0125226 A1 | 5/2013 | Shah et al. |
| 2013/0174246 A1 | 7/2013 | Schrecker et al. |
| 2013/0179681 A1 | 7/2013 | Benson et al. |
| 2014/0047546 A1 | 2/2014 | Sidagni |
| 2014/0188796 A1 | 7/2014 | Fushman et al. |
| 2014/0208405 A1 * | 7/2014 | Hashai ................................ 726/7 |
| 2014/0235230 A1 | 8/2014 | Raleigh |
| 2014/0237236 A1 | 8/2014 | Kalinichenko et al. |
| 2014/0351954 A1 | 11/2014 | Brownell et al. |

OTHER PUBLICATIONS

Symantec, Administration Guide for Symantec TM Endpoint Protection and Symantec Network Access Control, Aug. 1, 2007.

* cited by examiner

SYSTEM AND METHOD FOR INTEGRATING TWO-FACTOR AUTHENTICATION IN A DEVICE

CROSS-REFERENCE TO RELATED APPLICATIONS

This application claims the benefit of U.S. Provisional Application Ser. No. 61/768,248, filed on 22 Feb. 2013, which is incorporated in its entirety by this reference.

TECHNICAL FIELD

This invention relates generally to the authentication and authorization field, and more specifically to a new and useful system and method for integrating two-factor authentication in a device in the authentication and authorization field.

BACKGROUND

Passwords are becoming increasingly easy to compromise. Passwords can be stolen, guessed, or hacked. One form of authentication that has seen a rise is two-factor authentication (TFA), which uses a secondary device such as a phone to provide an additional factor of authentication. Integrating such a tool into an application, however, can be challenging. For some service providers, building a TFA system is outside of the service provider's core competency. In some cases, an outside TFA service can be used. This solution can expose a secondary service to the user that provides the TFA as a service, but this can be disruptive to users of the primary service or application. Introducing a third party TFA application may additionally be undesirable by the service provider. Thus, there is a need in the authentication and authorization field to create a new and useful system and method for integrating two-factor authentication in a device. This invention provides such a new and useful system and method.

DESCRIPTION OF THE PREFERRED EMBODIMENTS

The following description of preferred embodiments of the invention is not intended to limit the invention to these preferred embodiments, but rather to enable any person skilled in the art to make and use this invention.

1. System for Integrating Two-Factor Authentication in a Device

Figure 1:
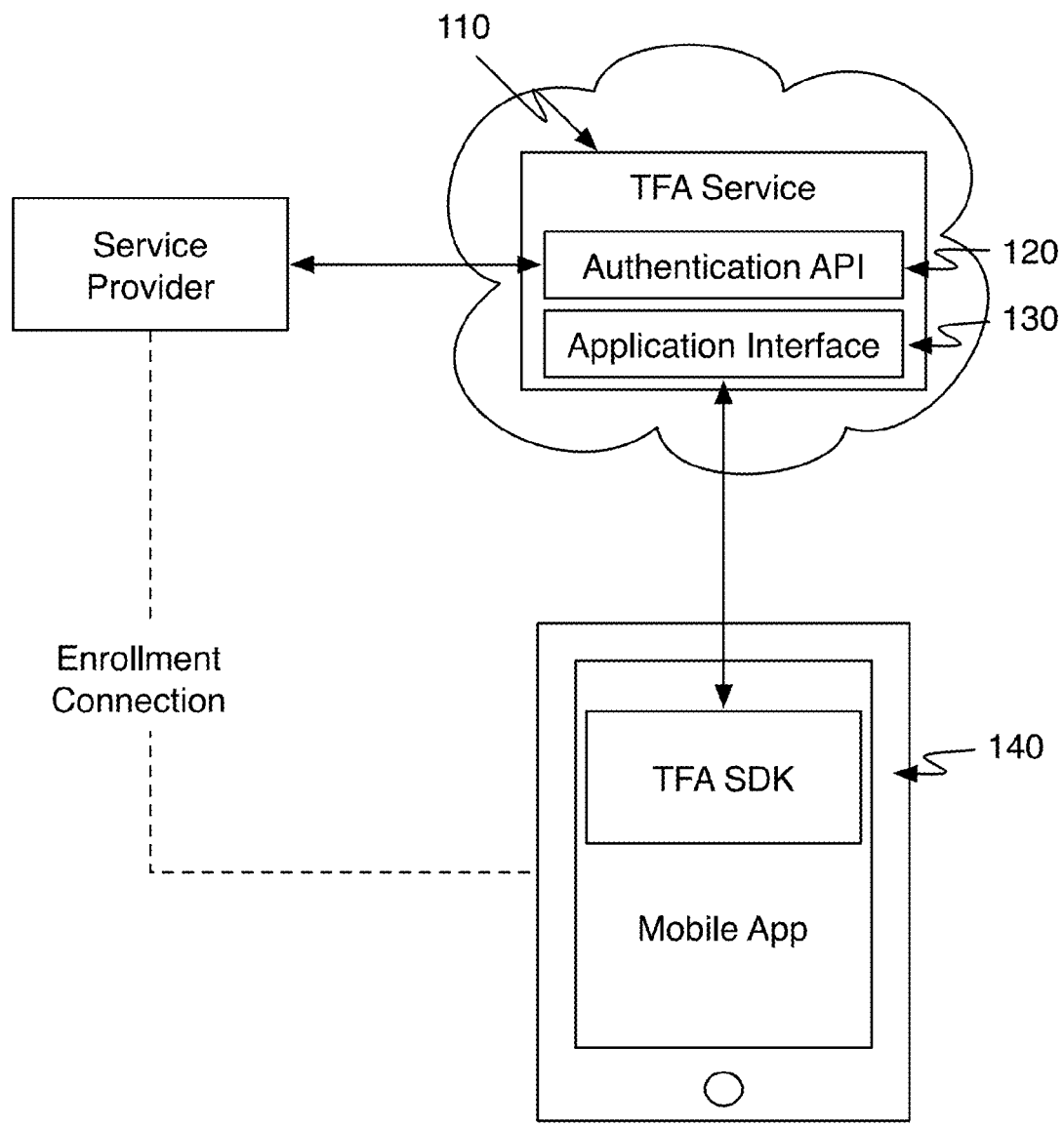
FIG. 1 is a schematic representation of a system of a preferred embodiment.

As shown in FIG. 1, a system for integrating two-factor authentication in a device of a preferred embodiment can include a two-factor authentication (TFA) service 110 with an authentication application programming interface (API) 120 and a device application interface 130. The system can additionally include a two-factor authentication (TFA) client service 140. The system functions to allow a two-factor authentication or authorization solution to be seamlessly integrated into operation of a service provider. The TFA service and system can be configured to be transparent to the end user of the service provider. The system preferably enables an outside service provider to create a branded or co-branded TFA implementation that can look and feel cohesive with the product of the service provider. To a user of the service provider, the TFA can appear to be implanted by the outside service even though logic and authentication functionality is at least partially performed by a system of a preferred embodiment. The service provider may be a web application, a mobile application, or any suitable device or application. In some exemplary implementations, the service provider will have a primary client portal and a secondary personal device portal. The primary client portal can be a web application, a desktop client application, gaming system or application, a vehicle computing system, an internet connected device, or any suitable primary client portal that depends on user authentication. The secondary personal device portal is preferably an application on a mobile computing device such as a phone, tablet, wearable computing device or any suitable computing device. The primary client portal can be accessed by a device different from the device of the secondary personal device portal, but the primary client portal may alternatively be accessed through the same device as the device of the secondary personal device portal (e.g., accessing a web site on a mobile browser and performing a second factor of authentication through a secondary application on the phone). The secondary personal device portal preferably includes or utilizes the TFA client service 140 to provide a second layer of authentication to an authentication attempts made through the primary client portal. The system can additionally or alternatively be used for authorization as described in U.S. patent application Ser. No. 13/039,209, filed 02 Mar. 2011, which is incorporated in its entirety by this reference.

Figure 2:
FIG. 2 is an exemplary screenshot of a device application view of a co-branded variation.

In one preferred embodiment, a web application can use the system so that a push notification or code is generated in a branded native application on a device. The push notification or codes are subsequently used to verify that the user has access to an enrolled device application. In another preferred embodiment, a web application can use the system so that a push notification or code is generated in a co-branded native application, wherein the co-branded native application may be shared for multi-factor authentication of multiple applications or services as shown in FIG. 2. The system is preferably implemented for authentication but may additionally or alternatively be used for authorization or for any suitable form of an additional factor of security (e.g., used as a third factor of authentication or to authorize an authentication attempt). The system is preferably configured for using mobile applications on a mobile computing device as the second factor of authentication, but any suitable device such as a desktop computer or a TV connected computing device may additionally or alternatively be used.

The two-factor authentication (TFA) service 110 of the preferred embodiment functions to provide remote coordination, management, and operation of additional factors of security for a device application on behalf of a requesting service provider. The TFA service is preferably a multitenant internet accessible service. The TFA service 110 is preferably composed of at least one server system and more preferably a distributed server system, a server cluster, or any suitable web accessible service. The TFA service 110 will preferably maintain data records for registered device IDs (or alternatively accounts, usernames, or other suitable identifiers) and the associated device(s) that should be used for two-factor authentication. The TFA service no may alternatively be described as a multi-factor authentication service and be used as any additionally factor or layer of authentication or authorization. The database of records for registered devices can additionally manage and store notification credentials, which are used in pushing or publishing notifications to the secondary device and/or application. The TFA service 110 preferably interfaces with at least a requesting service provider and a device running an application that can be used as the secondary factor of authentication.

The authentication application programming interface (API) 120 of the preferred embodiment functions to provide a programmatic interface for outside applications. The authentication API 120 is preferably used by at least the service provider that is using the system to create a TFA implementation. The authentication API 120 accepts API calls/requests from various services. In one mode of operation of the authentication API, a service provider will enroll at least one user into the service by submitting an API call through the authentication API 120. For example, a web application will post an HTTP call to a "/enroll" endpoint of the authentication API 120 when a user selects to use TFA. The authentication API 120 will preferably reply with a status message an activation code. The activation code may alternatively be transmitted directly to the intended device. In another mode of operation of the authentication API 120, a service provider will often enter a state where a user is attempting to complete some task requiring authentication (e.g., login, perform a sensitive transaction), and the service provider will then make an API call through the authentication API 120 that initiates the two TFA process.

In one exemplary TFA request process, a service provider can post an HTTP call to a "/auth" endpoint of the authentication API 120. The post can include a user identifier (which will use the associated enrolled device for the second factor of authentication), optionally a preferred medium of TFA, additional meta-data or information about the authentication request, selection of an asynchronous mode, secondary device ID (to select one of multiple registered devices for a user), and/or other authentication parameter options. The medium of TFA can include push (possibly specifying an application ID if multiple apps or destinations have "push" capabilities), passcode, SMS/MMS, phone, or other suitable channels of two-factor authentication. In a synchronous mode, the response to an authentication request is made once the TFA transaction has completed or optionally timed out. In an asynchronous mode, the response to an authentication request include an authentication transaction identifier that can be used to asynchronously check on the status of a TFA transaction. An authentication transaction can be queried by making a call to "/auth_status" with the transaction ID of the authentication transaction in question. The authentication API 120 or other suitable components of the system can facilitate management and storage of user/device information and/or authentication request state and history. The authentication API 120 may additionally be used for communication with a mobile application or other devices used as a second factor of authentication. The authentication API 120 is preferably an application layer protocol (e.g., HTTP, HTTPS, SPDY, etc.) based API and may be any suitable type of API such as a REST, SOAP, or other suitable form of API.

The TFA authentication request is preferably cryptographically secured to enable trust between the service provider and the TFA service no. During a configuration stage, the service provider can create a new SDK configuration with the TFA service 110. A service provider can have one or more SDK configuration, and each service provider is preferably given unique set of configuration parameters. The TFA service no can share an integration key and a secret key. These can be obtained from an administrator web panel of the TFA service provider. Additionally, the service provider can be assigned an API hostname, which can be a unique URL host endpoint used for API requests by the service provider. The TFA authentication request can additionally rely on synchronized server time between the TFA service 110 and the service provider. The service provider additionally generates a secret application key that can be kept secret from outside entities including the TFA service 110. When ready to make a TFA, the service provider signs the authentication request using the integration key, the secret key, the secret application key, and a user identifier. In one variation, the service provider performs HMAC-SHA of the user identifier, the integration key, and an expiration timestamp using the secret key as the HMAC key after the first factors of authentication are completed by the service provider. This can be completed through a library operation provided by the TFA service provider. The response of the authentication (synchronous or asynchronous) can be a signed response from the TFA service 110. The service provider can use a verify response library function to verify the outcome of the TFA. The verification can use the integration key, the secret key, the application secret key, and the signed response. Verification can apply HMAC-SHA1 to the signed response to ensure the response is signed by the TFA service and preferably that the signature was not modified by the client in any way. Other suitable cryptographic security measures may additionally or alternatively be used.

The application interface 130 of the preferred embodiment functions to enable applications to interact with the TFA service 110. The application interface 130 may be included as a communication component of the TFA service 110. In one variation, an application uses the authentication API or a similar API to communicate with the mobile device. The API of the application interface 130 can be private but may alternatively be exposed. The application interface 130 is preferably used by the TFA client service 140. The authentication interface 130 is preferably engaged when enrolling a new device, when notifying a device of an authentication request, and/or receiving user response to an authentication request. Communication between the TFA service no and the secondary personal device can additionally involve the use of other communication channels such as a push notification network, SMS network, MMS network, phone network, or any suitable communication channel.

The TFA client service 140 of the preferred embodiment functions to provide a device side component to facilitate TFA verification from a device. The TFA client service 140 can be one of several different variations that include a TFA software development kit (SDK) or library embedded within a native application of the device, a standalone application callable by other applications, and/or an operating system level callable service. The system can be configured to incorporate any of the above or other suitable variable forms of the TFA client service 140 into operation of the system. For example, one service provider can integrate the TFA SDK into their app, and a plurality of disparate service providers can use a callable service TFA client service 140. The TFA client service 140 preferably enables the service provider to customize (e.g., "brand") the TFA experience. This can range from customizing all views and interactions around notifying and receiving user input to selecting colors and graphic configurations.

Figure 3A:
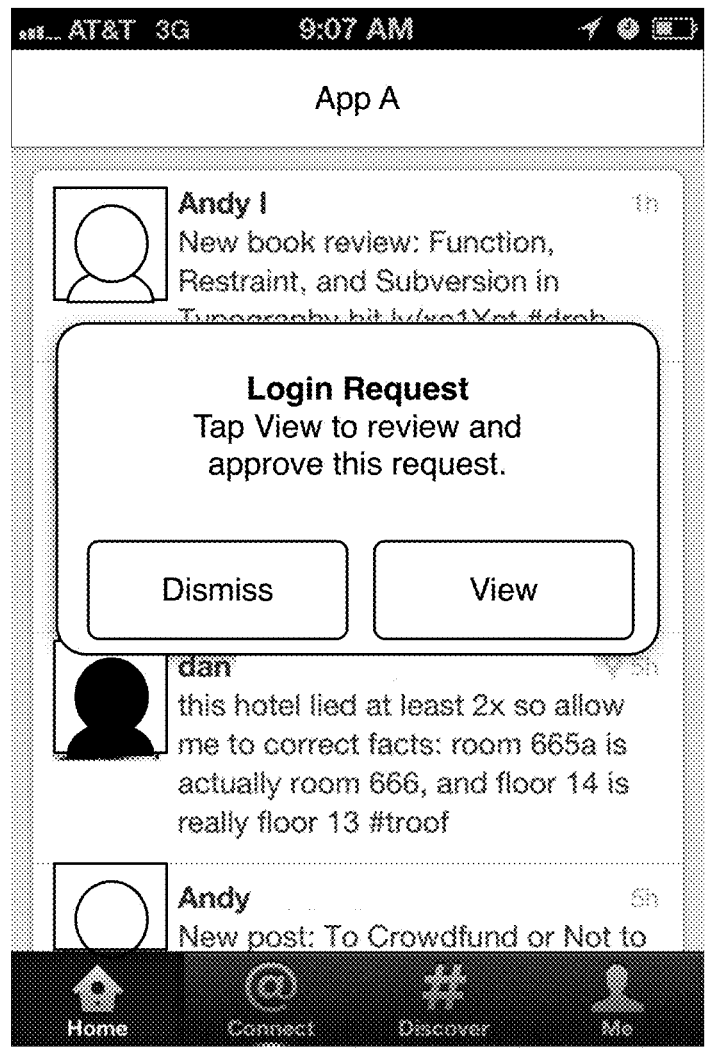
FIGS. 3A-3C are exemplary screenshots of a device application flow of a branded application using the two-factor authentication software development kit of a preferred embodiment.
Figure 3B:
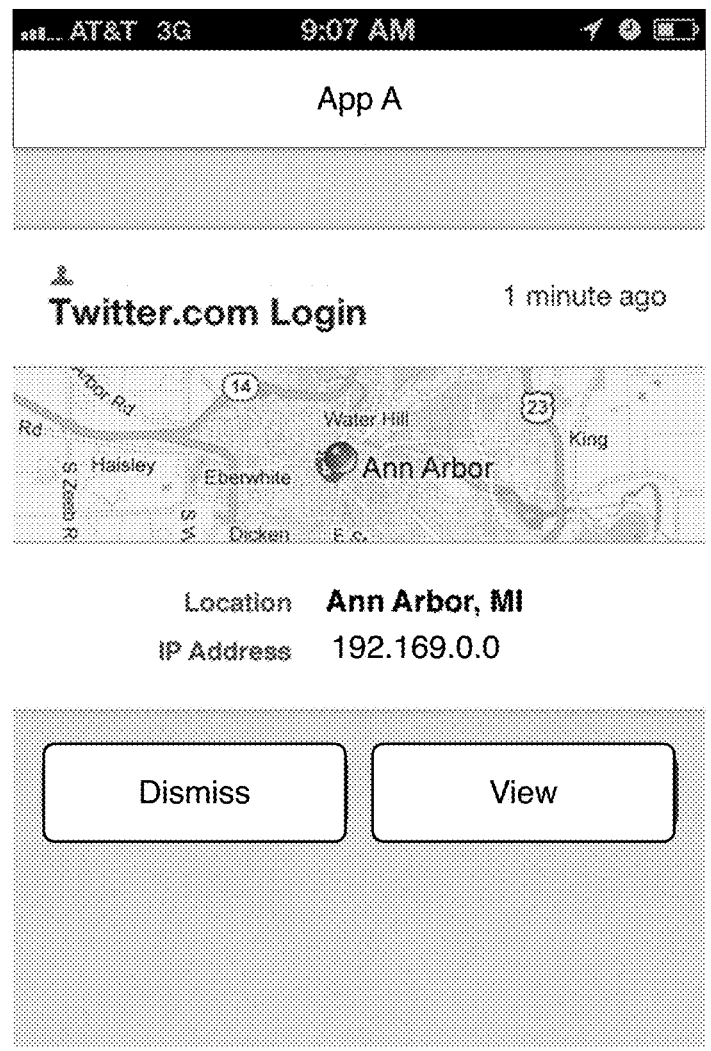
Figure 3C:
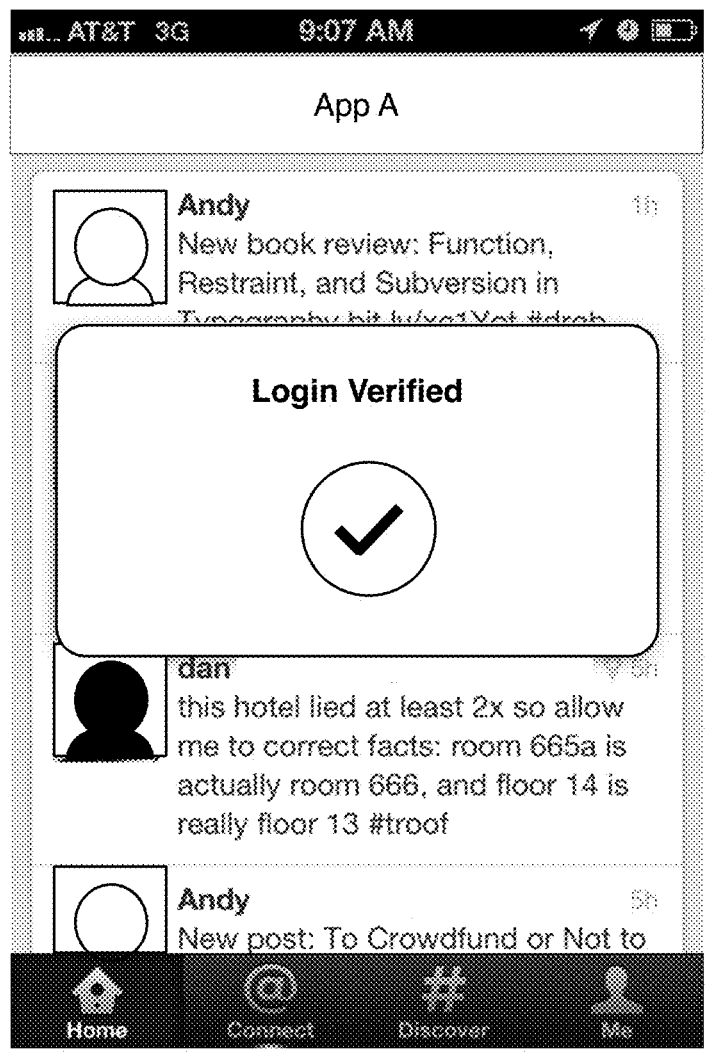
Figure 4:
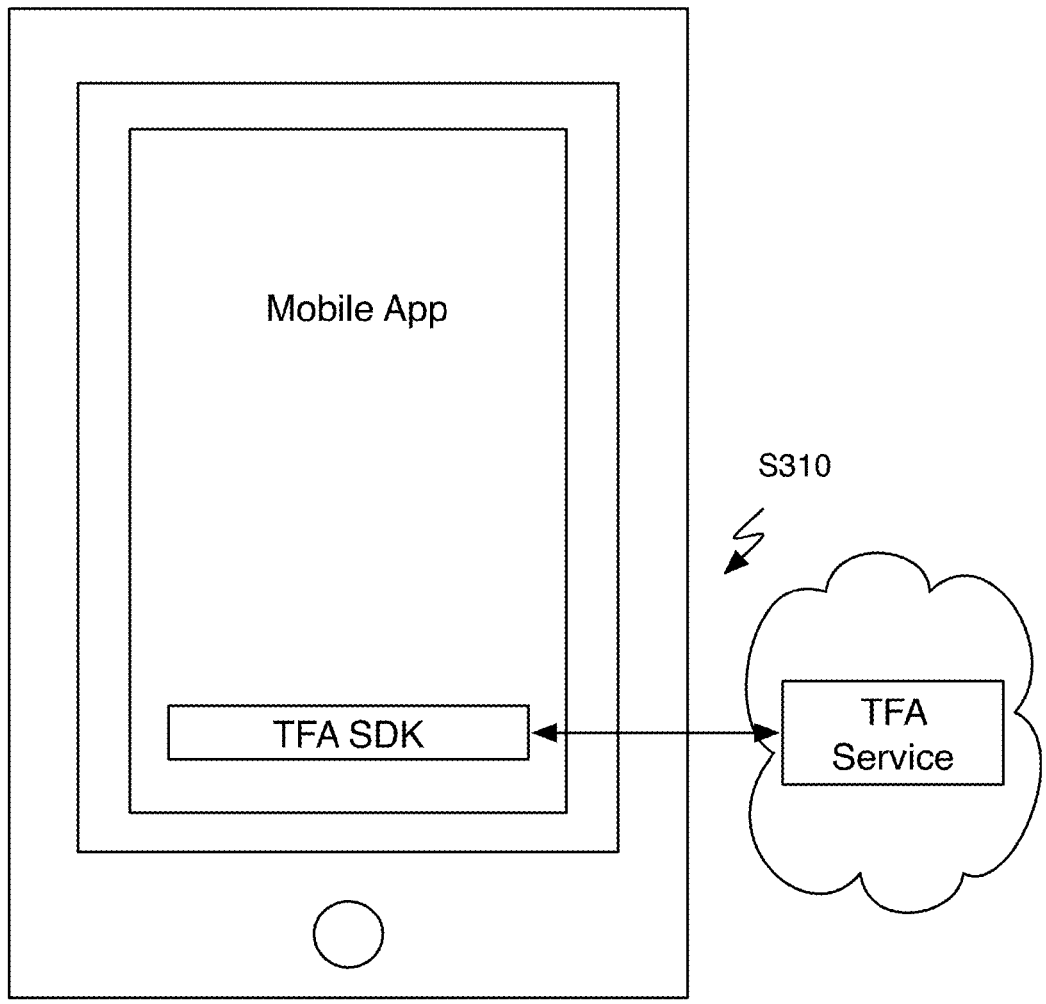
FIG. 4 is a schematic representation of a TFA SDK interacting with the TFA service from within a native application.

In one preferred implementation the TFA client service 140 of the system includes a TFA software development kit (SDK) or library that defines interactions, communication, and processing of a secondary device. The TFA SDK is preferably used to enable the device application to function as a second factor of authentication. The TFA SDK is preferably a software module integrated in a device application. The TFA SDK can be provided as source code configuration or as compiled binary version of the TFA SDK. A developer of the device application will preferably include or link the TFA SDK components such that the methods, data, and operational logic of the TFA SDK are compiled or otherwise included in the device application. The TFA service no preferably communicates with an application through an application interface 130, and the TFA SDK manages that communication and abstracts processing for other operative software components of the application. The device application may be developed by the service provider or any suitable outside entity. The interface and appearance of the device application may be customized to the purposes of the developer. As shown in FIGS. 3A-3C, the authentication process can be integrated within a native application for a web service. The native application preferably embeds or includes the TFA SDK, which communicates with the TFA service as shown in FIG. 4. The interaction flow, aesthetics, and features can be customized for the particular application. In an alternative embodiment, the device application may be an authentication application that allows a plurality of service providers to create a co-branded or partially customized experience.

Figure 5:
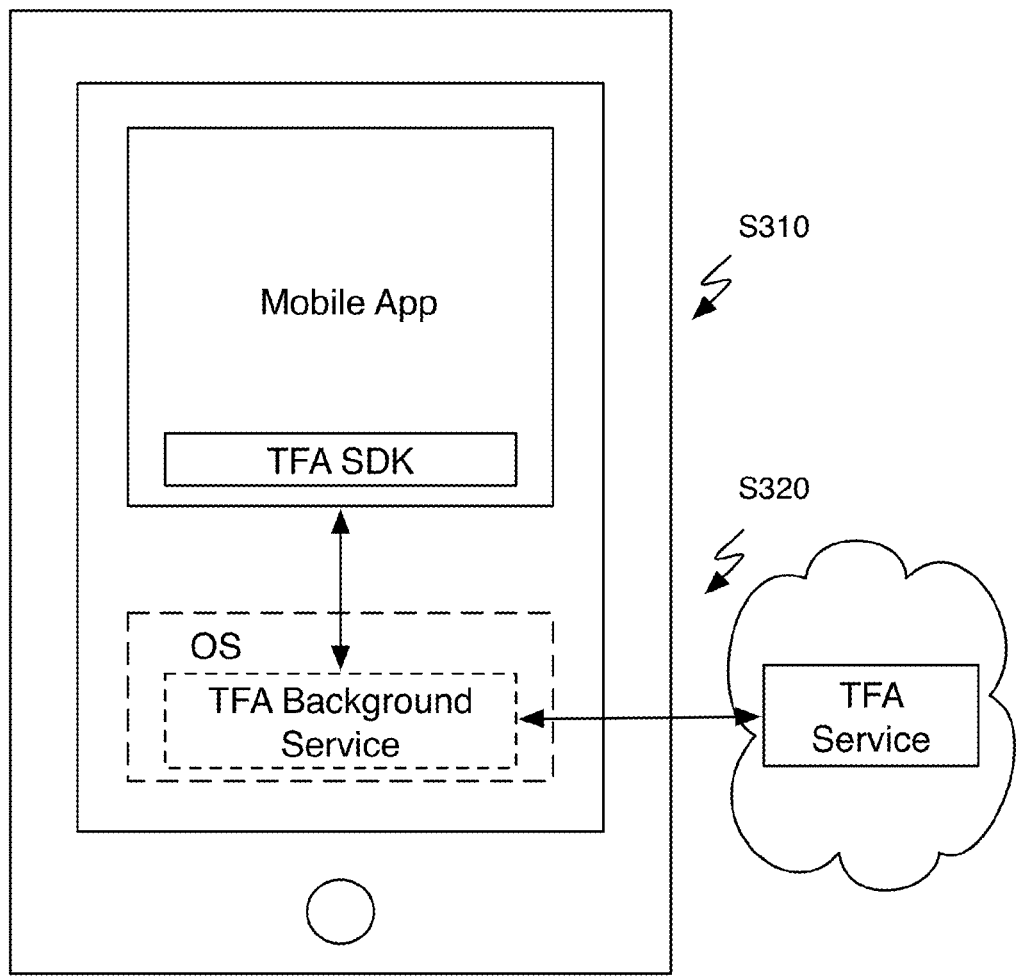
FIG. 5 is a schematic representation of a TFA SDK interacting with the TFA service from a background service.

In another preferred implementation, the TFA client service 140 of the system includes a system callable service, which functions to provide a mechanism for native client application integration through an external mechanism. The system callable service is preferably a component configured substantially similar to the TFA SDK in how the callable service communicates with the application interface 130 and the TFA service 110. However, the callable service can be a background service that exists outside of the application using the callable service. The callable service can be a background application installed by the user or the callable service can be a background application installed by an administrator of the device (e.g., if the device is managed as part of a fleet of enterprise devices) or the phone/OS provider as shown in FIG. 5. Alternatively, the callable service can be a service available as part of the operating system. The callable service preferably includes a device wide interface that enables other applications to call, activate, or otherwise interact with the callable service. In a preferred implementation, an application will programmatically call the background callable service to complete TFA specific tasks such as enrolling a device, accessing TFA request information, authentication a TFA request, canceling a TFA request, marking a TFA request as fraud, and/or any suitable TFA action. A callable service can include managed tokens and device cryptographic credentials that are stored within memory with permissions scoped, sandboxed, or otherwise limited to access by the callable service—applications of the service providers cannot access the TFA credentials.

Figure 6:
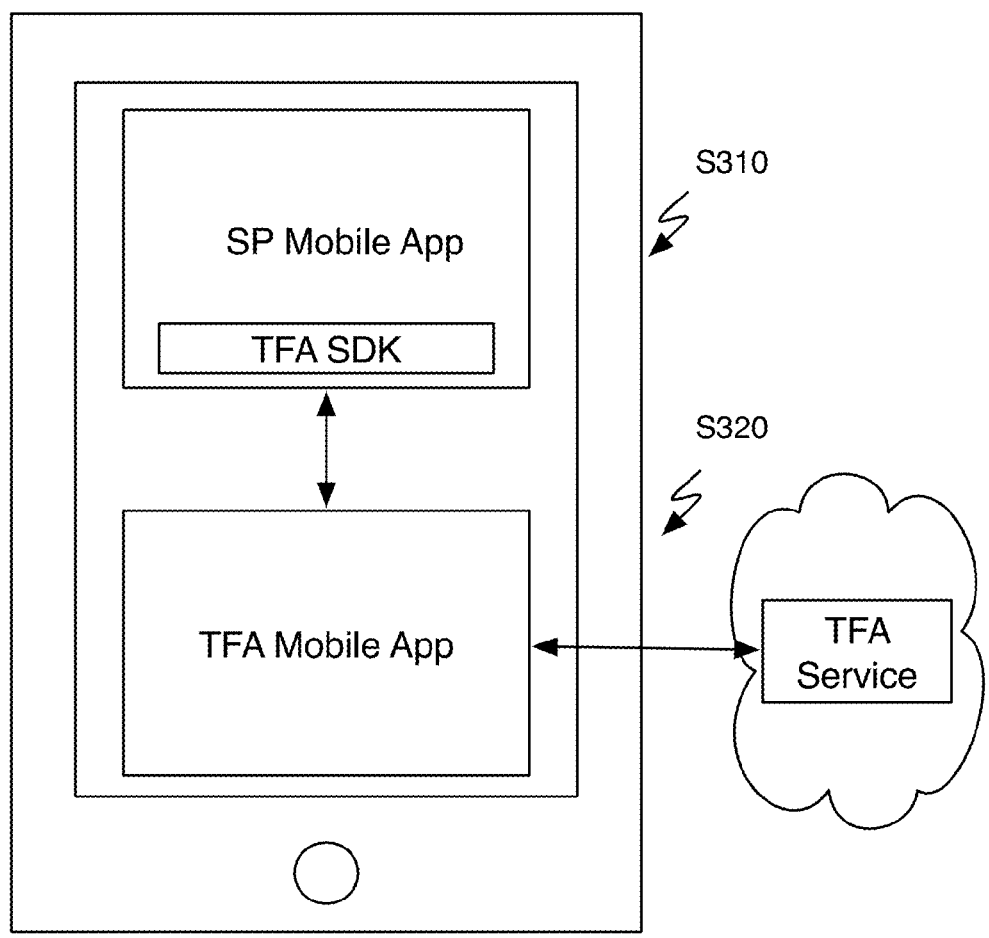
FIG. 6 is a schematic representation of a TFA SDK interacting with the TFA service from a secondary application.

In another preferred implementation, the TFA client service 140 of the system includes an application callable service, which functions to provide a mechanism for native client application integration to depend upon for TFA. The application callable service is preferably a user facing application that provides the user interface of the TFA process as shown in FIG. 6. As opposed to the application transparently using a background callable service as described above, the application can transfer user interface control to the application callable service for TFA related interactions. In other words the application of a service provider delegates TFA user flows to the user interface and application logic of the application callable service. The application callable service can be a separate application that is downloaded and installed by the user. As with the system callable service, the application callable service can be used by multiple disparate applications that implement TFA through the system. The interface of the application callable service can be skinable or otherwise customizable by a service provider. The application preferably uses a device wide interface to transfer to and from the application callable service. The device wide interface can be application URI redirection, wherein different applications register different URI protocols and accessing a URI with that protocol results in passing the URI handling to the corresponding application. The system callable service can include registration for a system URI scheme and store a URI scheme of the sending application such that an application can redirect to a TFA native application and then transfer back to the application. Other suitable inter-application communication and switching mechanisms may alternatively be used. Push notifications can go through the third party application and redirect to the application service. Alternatively, push notifications can go through the application service and redirect to an appropriate application. As mentioned above, any of the variations TFA client services 140 can exist and be selectively engaged depending on the context and specific service provider.

2. Methods for Integrating Two-Factor Authentication with a Device

Figure 7:
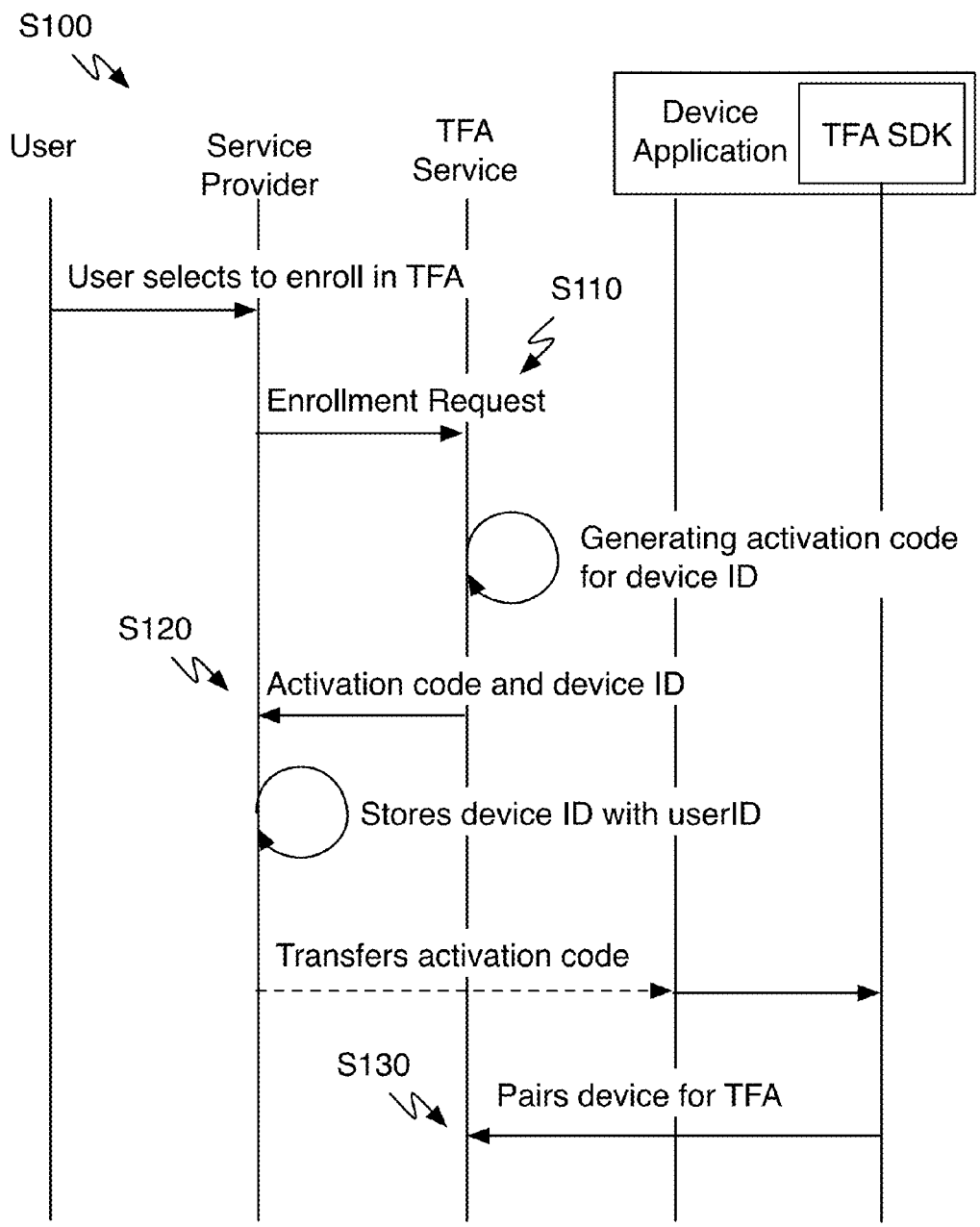
FIG. 7 is a sequence representation of a method for processing an enrollment request for a device application of a preferred embodiment.
Figure 8:
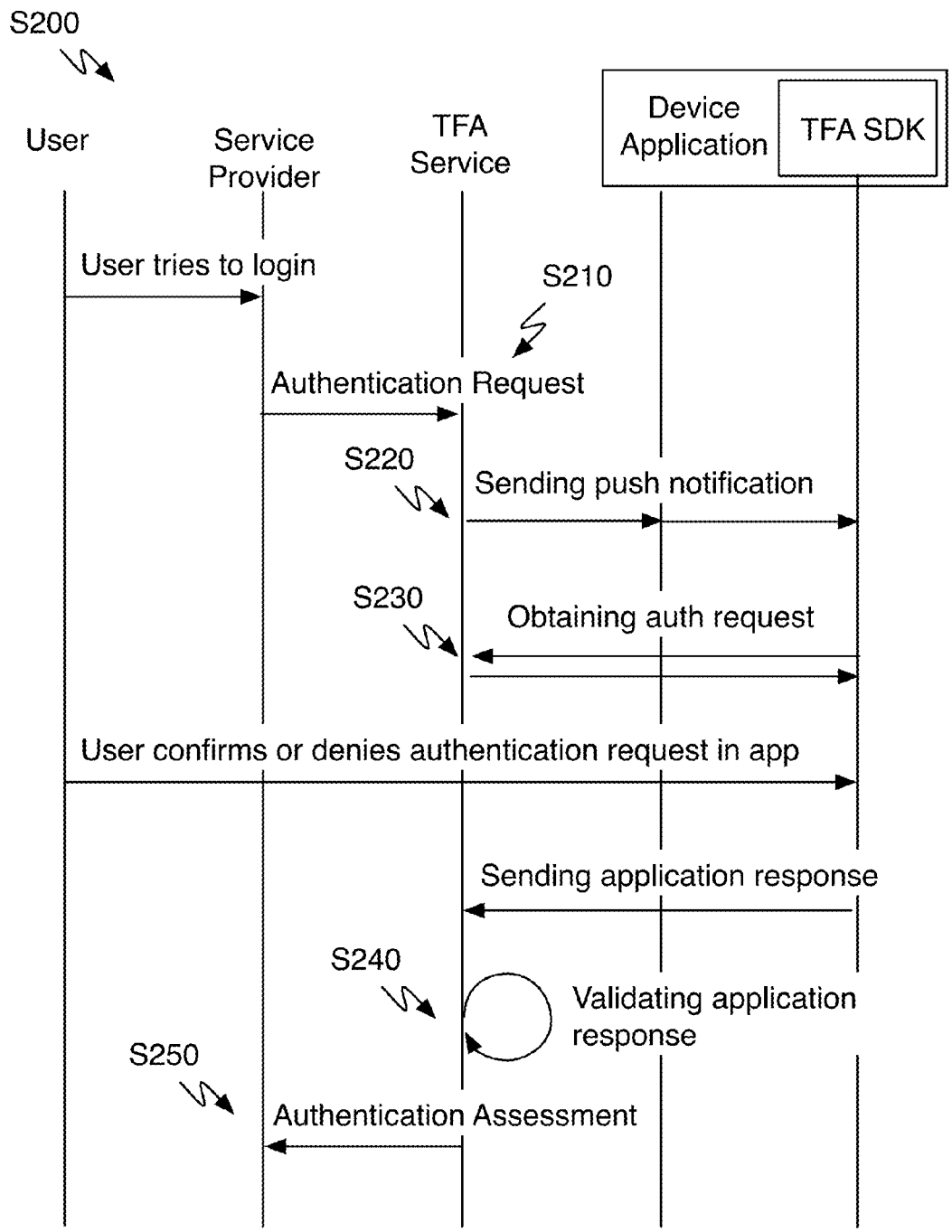
FIG. 8 is a sequence representation of a method for executing a two-factor authentication request for an enrolled device application of a preferred embodiment.

As shown in FIGS. 6, 7 and 8, a method of a preferred embodiment preferably includes processing an enrollment request for a device application on behalf of a service provider S100 and executing a two-factor authentication request for an enrolled device application on behalf of the service provider S200. More specifically, the method of a preferred embodiment preferably includes receiving an enrollment request of an account S110, transmitting an activation code S120, pairing a device with the account through the activation code S130, receiving an authentication request for an enrolled application S210, notifying the application S220, delivering the authentication request to the application S230, validating an application response S240, and transmitting an assessment S250. The method preferably functions to allow an application developer to seamlessly integrate a two-factor authentication or authorization service into a web portal, application, or device. The service provider is preferably a web service, web application, or other device that has an additional access portal such as a mobile application.

The method enables a TFA challenge to be populated within a branded device application of the service provider as opposed to an application of the TFA service. For example, a user may access a Service Provider A and choose to enable two-factor authentication. The user then uses a mobile application of Service Provider A to complete enrollment. When the user subsequently tries to log into the web application of Service Provider A, a TFA login request may be pushed to the mobile application. This scenario is preferably completed while Service Provider A is leveraging an outside TFA platform service. Alternatively or additionally, a passcode can be generated on the mobile application and authenticated by the TFA service.

In a second preferred embodiment, a TFA challenge may be populated within a co-branded application that may be at least partially customized by the service provider. For example, the service provider may set parameters of how TFA occurs, and a logo and other branding aspects specified by the service provider. In such a variation, a single application may be used to provide TFA challenge interactions for a plurality of application entities. In another variation, the TFA challenge is performed through a third party application and cooperatively facilitated by the co-branded application. The user flow of TFA can included redirection from the third part application to the co-branded application to complete the authentication, and then redirecting back to the third party application. In one implementation, customization directives are passed from the third party application to the co-branded application. The customization directives can specify defined interface assets (e.g., graphics, fonts, etc.), layout, and/or other styling. In an alternative implementation, the customization directives can be stored within an SDK configuration of the service provider and retrieved from the TFA service when rendering the interface in the secondary application.

The two-factor authentication system and processing is preferably transparent to the user. The method may include automatically or selectively determining a mode, medium, and/or mechanism of TFA according to the application configuration of the requesting service provider and/or account. The authentication mode can be selected from a set of options that can include notification mode, passcode mode, SMS mode, and/or any other suitable mode of an additional factor of authentication. If a mode is not specified or selected, a default mode may be selected, or alternatively a mode can be automatically selected according to the account. The history of the account (e.g., the last used mode), the default mode of the account, or any suitable heuristic can be used. The method can additionally support multiple configurations for a single service provider/account pair. Different accounts of the same service provider or different service providers can use different modes. The method preferably uses a TFA client service of a TFA SDK, a background callable TFA service, and/or an application callable TFA service.

Figure 10:
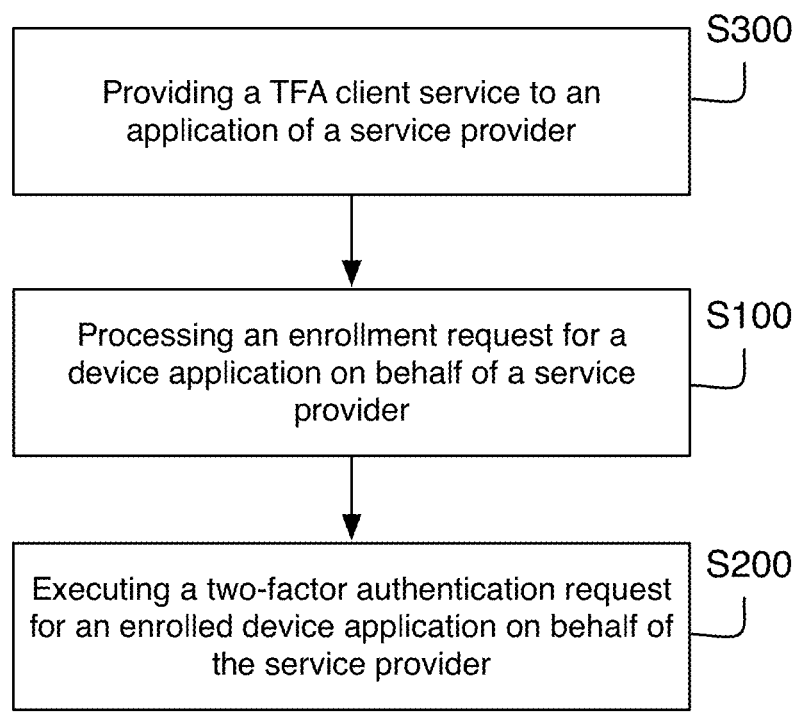
FIG. 10 is a flowchart representation of a method of a preferred embodiment.

The method additionally includes providing a TFA client service to an application of a service provider S300, which functions to integrate TFA application logic and authentication data management within the interactions of an outside application as shown in FIG. 10. Step S300 preferably enables outside developers and users of an authentication layer (e.g., a TFA service platform) to provide multi-factor authentication or authorization functionality without exposing end users of the service provider to the TFA service platform, which may be an unknown entity to the end user. Providing a TFA client service to an application of a service provider S300 can include providing a TFA SDK S310, providing a callable client service S320, and/or providing an application callable service S330, which all function to provide various mechanisms of integrating a third party application with a native application.

The TFA SDK of block S310 is preferably a downloadable data object distributed or offered by the implementer of the method (e.g., the TFA service platform). The TFA SDK is preferably provided as source code configuration, binary configuration, mixed source and binary configuration, and/or any suitable data object form. The Service provider (or more likely a developer on behalf of the service provider integrates the TFA SDK into an application of the service provider. The TFA SDK can be a framework linked in application source code development, a library downloaded and included within the third party application, or integrated in any suitable manner. A documented interface is preferably provided such that application logic configuration can interact with the TFA SDK during execution of an application instance. The TFA SDK is preferably compiled, assembled, linked, and otherwise integrated into the executable file, resource, or data object that is distributed to devices of end users. Users of an application instance can preferably utilize application logic and resources of the TFA SDK by using the application.

As mentioned above, there may be different modes that a service provider can use the provided TFA SDK. In a first mode, the TFA SDK is used within a third party application instance. Communication, cryptographic processing (e.g., storing tokens, signing of requests, verification of signatures, generation of passcodes, etc.), user interaction management (e.g., displaying TFA request details, receiving user input, etc.), and other TFA related processes can all be managed within the third party application. The third party application mode can afford a high level of customization control. The TFA SDK is preferably compiled into the third party application. In a second mode, the TFA SDK is a secondary application that is instantiated on the same device as a third party application. The secondary application is preferably distributed by the TFA service provider, and can be used by multiple third party applications. TFA operations that are triggered in the third party application can be redirected to the secondary application. In a modular operating system, the application focus switches from the third party application to the secondary application. Redirection can alternatively bring the secondary application to the foreground within an application stack. The secondary application can act to centralize the storage, management and service communications to a single controlled application. In a third mode, the TFA SDK is installed as a background service. Similar to how TFA operations can be redirected to the secondary application, TFA operations can be redirected to the background service. User interface elements are preferably presented and controlled by the third party application.

As shown in FIG. 7, processing an enrollment request for a device application on behalf of a service provider S100 of a preferred embodiment can include receiving an enrollment request of an account S110; transmitting an activation code S120; and pairing a device with the account through the activation code S130. The method of processing an enrollment request functions to create an association, link, or mapping between an account and at least one device. Preferably, a mobile application is enrolled as the second factor of authentication, but any suitable device or application instance may be enrolled. Additionally, a plurality of devices may be enrolled and associated with an account. Additional device pairings may be used as backup devices or for alternative roles (e.g., device of account user for authentication and device of an administrator for authorization). The pairing is preferably made on behalf of a service provider that is utilizing a TFA platform service (e.g., system implementing the method) and pairs with a TFA client service that is integrated with an application of the service provider. Herein, the method is described from the perspective of a TFA service that interacts with service providers and third party application instances, the method can additionally include the operational steps of the service provider, the application instances, TFA application instances, and/or other suitably involved components.

Step S110, which includes receiving an enrollment request of an account, functions to be notified by a service provider that a device application should be provisioned for an account. The enrollment request will preferably be made by a web application, a native application, a web service, or some other outside service provider. The TFA service is preferably configured to support TFA services for a plurality of service providers. Each service provider can include multiple user accounts that can be enrolled in the TFA service for TFA. Step S110 can initially include configuring SDK usage of a service provider, which functions to initially set up a service provider to use the TFA SDK with a client application for authenticating events of the service provider (e.g., login events). Configuring SDK usage can include sharing/synchronizing of integration tokens, secret tokens, server time, API hostnames, and other suitable properties used by the service provider and the client applications.

After a service provider is configured in the TFA service, users can be enrolled or added to the TFA service. The enrollment request is preferably made through an API by a service provider and received at a TFA service. Alternatively, the enrollment may be made through a user interface control panel of the two-factor authentication service or any suitable user interface. The requesting entity is preferably an administrator/developer account of the service provider in the TFA service. The requesting entity preferably initially authenticates the account or alternatively provides authentication credentials in the parameters of the enrollment request so that the enrollment request can be validated. The enrollment request is preferably an API call to an enrollment resource (e.g., "/enroll"). The enrollment request can include parameters such as a username of the account associated with user device, platform of the user device, the role of the user device (e.g., default TFA device, backup TFA device, authorization device, etc.), mode of TFA (e.g., passcode or pushing a login request), expiration as a TFA device application, or any suitable parameter to associate with a device application.

Step S120, which includes transmitting an activation code, functions to respond to the enrollment request. The TFA service preferably generates a unique activation code and a device identifier (ID). The device ID is preferably generated for the account and associated with the unique activation code. Once the device is activated through the activation code, the TFA service can use the device ID to know which device should be used in performing TFA. In one preferred embodiment, the TFA service may only store a record of the device ID and necessary information to communicate with the related device. The TFA preferably transmits the activation code and the device ID. In this embodiment, control and responsibility of associating devices with the account is delegated to the service provider. In an alternative embodiment, the TFA service may additionally or alternatively use a supplied username or account ID provided by the service provider. The username, account ID, requesting entity ID, or any suitable unique identifier may be used as the device ID or as an associated parameter. In one variation, the activation code is encoded into a URI. In another variation, the activation code is a character-based key. In another variation, the activation code may be graphical encoding of the activation code such as a QR code, bar code, or a computer readable code. The activation code is preferably single-use, and the activation code may additionally have an expiration time window or other conditional properties. For example, the activation code may require the enrolling device to have a particular version of the mobile application, be of a particular device type, be from a particular geographical location, or have any suitable property.

A service provider that receives the device ID and activation code can preferably use that information to activate an instance of a device application (i.e., an application on client device used as an additional factor of authentication such as a smart phone or mobile computing device). The service provider will preferably store the device ID in a database relating the device ID to the associated account. The device ID can later be used in initiating a TFA interaction with the device. Additionally, the service provider transmits the activation code to the user device or otherwise facilitates the transfer of the activation code to the device. This may be done in a number of ways. The activation code may be emailed, sent in an SMS message, sent in an MMS message, sent in an application message (e.g., push notification or application specific notification/message), displayed as a QR code, or transmitted in any suitable medium. The activation code is preferably received by an instance of a device application that preferably implements the methods of a TFA SDK or alternatively natively implements methods to communicate with an application interface of the TFA service. In a variation where the activation code is a URI, the URI may specify a particular application on the client device to redirect to upon accessing the URI, the specified application can then process the activation code. When the URI is opened, the mobile application may be able to recognize the URI as an activation code and trigger an activation process using the activation code portion of the URI. The activation URI may additionally be used to initially load a website where if the required applications are installed to complete TFA, the user redirected to the appropriate application, but if the required application is not installed, the user is prompted to install the proper applications before completing activation. In an alternative embodiment, the device application may scan a graphical activation code, receive a user transcribable code (e.g., a 6 digit code), or obtain the activation code in any suitable manner. In another variation, the service provider may recognize when the related account is logged in to a device application and transparently transfer the activation code directly from the service provider to the device application through a communication channel of the service provider. The activation code may alternatively be transferred to the mobile application in any suitable manner.

Step S130, which includes pairing a device with the account through the activation code, functions to create an association between a device ID and a particular device application. The device application may process the activation code to verify that the request is valid. Additionally, the device application may perform any suitable configuration so that the device application may subsequently be used for TFA. Configuring for TFA may include characterizing the identity of the application instance and/or device; registering the application for push notifications, subscriptions, or other messaging systems; configuring a passcode generation service; collecting any information such as a pin code, passcode generation tokens, biometric readings, or other information; and/or performing any suitable processes for the application to be used as an additional factor of security. In one variation, a remote notification system (e.g., a push notification service of a carrier or phone manufacturer) may be configured with a notification certificate such that the TFA service can transmit application notifications on behalf of the device application.

The application preferably calls an 'activation' method of the TFA SDK, and the device application communicates pairing information between the TFA service and the device application. Upon successfully completing the pairing communication, the device ID is preferably uniquely associated with the application instance, and the application may be used as an additional factor of security.

As shown in FIG. 8, a method for executing a two-factor authentication request for the enrolled device on behalf of the application entity 5200 of a first preferred embodiment can include receiving an authentication request for an enrolled application S210; notifying the application S220; delivering the authentication request to the application S230; validating an application response S240; and transmitting an assessment S250. The first preferred embodiment of S200 preferably functions to enable validation of an authentication request from within the application. A notification or message is preferably sent to the device, which alerts the user. The notification or message preferably opens or directs a user to the application, and then a user can complete the two-factor authentication.

Step S210, which includes receiving an authentication request for an enrolled application, functions to have a web application initiate two-factor authentication. Preferably a service provider will make an API call to request TFA be completed for a particular device. In one variation, the authentication request preferably includes a device ID. The TFA service can access records for that device ID to determine the device application to notify in S220. In an alternative variation, the authentication request may include a user name, account ID, or an alternative identifier. The TFA service preferably has a record such that the associated device application can be identified. The authentication request can additionally indicate the form of TFA if there are various forms of TFA. One preferred form of TFA is verification through a notification. Another preferred form of TFA is verification through an application generated passcode as described below. Additionally, the TFA service may initiate a status API resource so that the service provider can asynchronously poll the status of the TFA process for a specific authentication request.

Step S220, which includes notifying the application, functions to push a notification from the TFA service to the device application. The TFA service preferably maintains a database associating account identifiers with the multi-authentication information. In one variation, the multi-authentication information is the device application communication addressing/communication information, which can be used to transmit authentication request information to the appropriate user device. In another variation, the multi-factor authentication. In one preferred embodiment, the TFA service pushes a message to the device through a notification service of a carrier or device manufacturer. A device push or messaging service will preferably display a message notifying a user of an authentication attempt, and upon user activation of the notification, the device application will open or load. In an alternative embodiment, Step S220 may be performed transparently, selectively skipped, or avoided entirely. If the application is already open, then the TFA service may send a message or the device application may poll the TFA service to identify when an authentication request is pending.

Step S230, which includes delivering the authentication request to the device application, functions to transfer necessary information to the device application to complete the authentication request. Preferably, the device application will send a message to the TFA service requesting the authentication request details. The TFA service will map the device application to the pending authentication request for the device ID and respond to the application with the request details. At the device application, the TFA SDK preferably facilitates the requesting and receipt of the authentication request details from the TFA service. The authentication request details may include a description of the type of request such as login, money withdrawal, change of password, or any suitable type of request. The authentication request details may additionally include the response options such as "confirm", "cancel", "fraud", or any suitable response.

The device application can process or manage of the authentication request in variety of different modes. Processing the authentication request can include verifying of the authentication request, rendering of authentication request information, obtaining user response, and transmitting a response to the authentication response. In a first mode the authentication request is delivered to a third party application that integrates the TFA SDK component. The third party application is preferably configured to process the authentication internally through internal calls to the TFA SDK. The user interface of the third party application can be entirely designed and customized to the specifications of the third party application. Alternatively, pre-configured user interface elements may be accessed through the TFA SDK. In an alternative mode, the TFA SDK tools are installed as a background service. A third party application is configured to use the public interface to access the background service. The user interface may similarly be fully defined within the third party application. In another mode, a secondary application that is configured to implement TFA SDK functionality can be used. In a first variation, the authentication request is received at a third party application; the third party application redirects to the second application, passing the authentication request; the secondary application processes the request; and the secondary application can then redirect back to the third party application. All authentication processing is performed through the secondary application in this mode. The redirecting to the secondary application can provide interfaces to provide user interface customization such specifying the styling and media assets used within the authentication interface of secondary application. In an alternative variation, Whether in the third party application, a background service, or in a secondary application, processing the authentication request functions to cryptographically secure communication with the TFA service and to obtain user intent regarding the authentication attempt. The received authentication request is preferably cryptographically verified using shared tokens between the application on the client device and the TFA service, which functions to ensure the request originates from the TFA service and is legitimate. The authentication request can include contextual information about the authentication request such as a description of the event such as time, location, event type, and the like. This information may be displayed to the user. Then various response options can be displayed. The response options preferably include confirm and cancel options, but may additionally include a fraud reporting option, and any suitable options. A user's selected response option can be received through the user interface elements of the device, and then used in replying to the authentication request.

Figure 9:
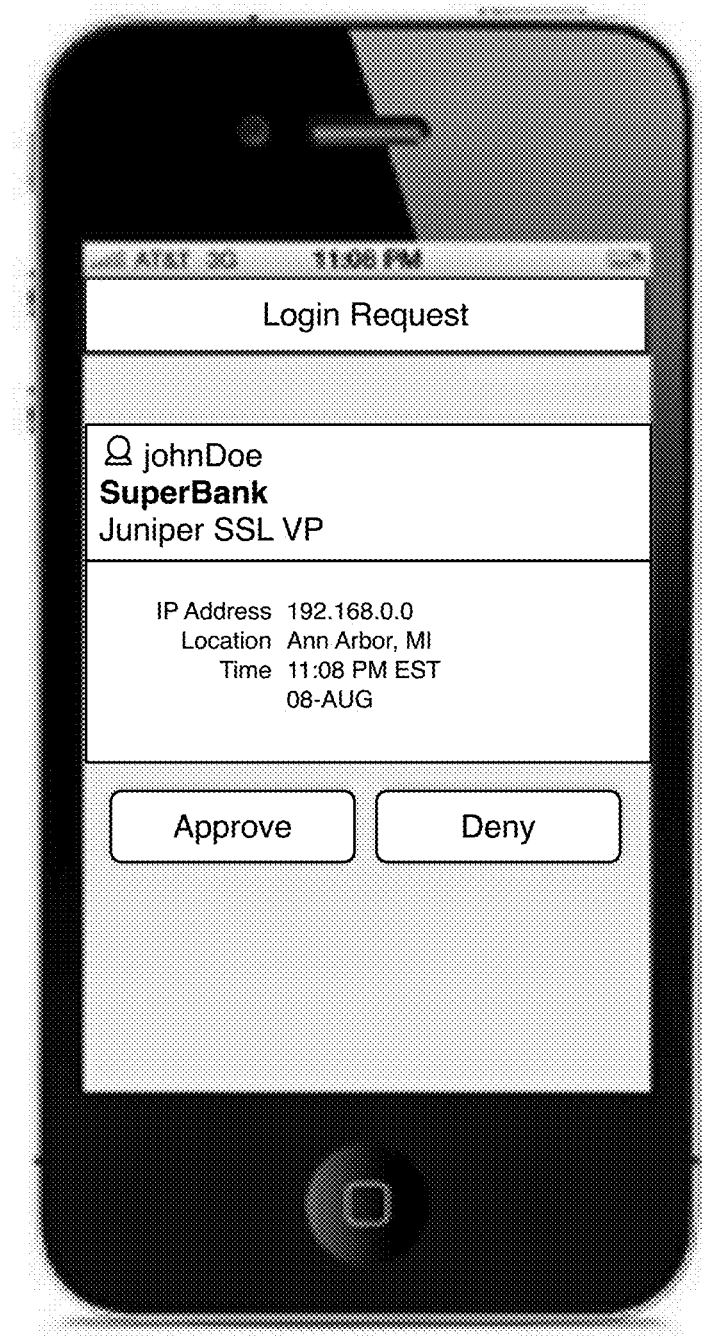
FIG. 9 is an exemplary screenshot of an authentication request confirmation view.

Step S240, which includes validating an application response, functions to obtain user confirmation. The application response is preferably received at the TFA service. The application response can include a cryptographic signature or be otherwise cryptographically validated as originating from the device. The TFA service can verify the origin of the authentication response. In one variation a signature could be verified through an asymmetric key verification process (e.g., verified with a RSA public key associated with the RSA private key used of sign the response from the device). In another variation, a symmetric key algorithm could be used. For the purposes of communication between the device application and the TFA service, confidentiality of the network transport is preferably preserved through a secure transport protocol (e.g., HTTPS, TLS, etc.). As described above, the application can use the authentication request details to render a login request confirmation view. The user can confirm or deny the request as shown in FIG. 9. Additionally or alternatively, the user may take any suitable action allowed by the TFA service. In one embodiment, the user must complete a challenge such as entering a pin or passcode, answering a security question, or completing any suitable form of challenge. The login request confirmation view is preferably rendered within the application. The application may apply any suitable styling, layout, and/or user interface customization to the confirmation view. Alternatively, the TFA SDK may provide a method to render a substantially pre-configured confirmation interface. The TFA SDK can additionally facilitate transmitting the obtained application response to the TFA service. Alternatively, the confirmation response may be communicated to the TFA service by the application or any suitable component of the device. The TFA service can validate, assess, verify, or check the response obtained from the application.

Step S250, which includes transmitting an assessment, functions to transfer the result of the second factor of authentication to the service provider. If the user confirmed the authentication request in the device application, the TFA service preferably communicates a successful completion of the second factor of authentication. If the user denied or canceled the authentication request, the TFA service preferably communicates an indication of the failure of the second factor of authentication. The failure can be explicit in that the authentication request is canceled, denied, or is responded to with an error. The failure can alternatively be implicit such as with a null response. Other response options such as an option to report fraud can additionally be delivered to the service provider, but alternatively, the reported fraud may be managed within the TFA service to detect fraudulent requests. The web application will preferably use the assessment in enforcing the user request occurring within the web application. For example, if the user was attempting to login to the web application, the transmitted assessment is used in allowing or denying the login request. The service provider may use the TFA response for any suitable alternative purpose.

Figure 11:
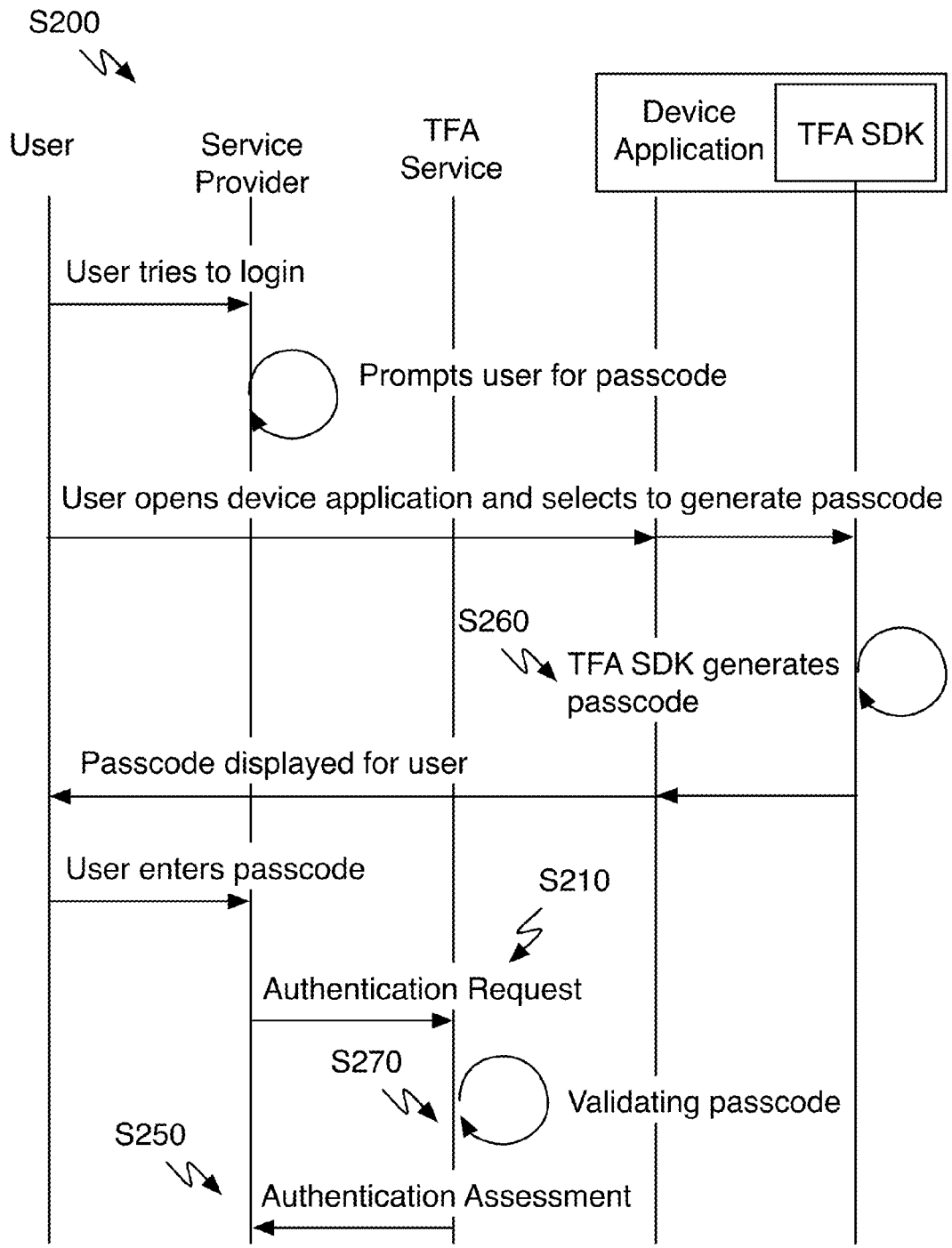
FIG. 11 is a sequence representation of a method for executing a two-factor authentication request for an enrolled device application of a preferred embodiment.

As shown in FIG. 11, a method for executing a two-factor authentication request of the enrolled device application on behalf of the service provider using a passcode S200 of a second preferred embodiment can include receiving an authentication request for an enrolled device application S210; generating a passcode in the device application S260; validating the passcode at the TFA service S270; and transmitting an assessment S250. This method can function to enable a TFA request to be completed without the device application communicating directly with the TFA service. The first preferred embodiment of using an application prompt and the second preferred embodiment of using a passcode may additionally be used in combination, as selective options by the service provider, and/or in combination with any suitable alternative forms of second factor security. The use of a passcode is preferably accompanied by configuring the passcode generation service during enrollment of the device application. Passcode generation may not require communication between the TFA service and the device application, and instead operates through passcode generation synchronized through credentials established on the device application through the activation code. The passcode generation may additionally be dependent on establishing an integration key of the service provider, a secret key of the service provider, or any additional token or key for the passcode generation service. The passcode generation service can exist within the device application (e.g., the device application uses an SDK that internally processes passcode generation requests), but the passcode generation service may alternatively exist external to the device application wherein the SDK is used to communicate with a secondary application or a background passcode generation service. In the case of the secondary application, the user interface can be customized according to interface directives of the device application/service provider.

Step S210, which includes receiving an authentication request for an enrolled device application, is preferably preformed substantially similar to that of the first preferred embodiment. In a variation, where the form of TFA is a selective option, the authentication request preferably indicates that the passcode form of TFA should be used. In one variation, the authentication request is performed after generating a passcode in the device application S260, and the passcode is preferably included in the authentication request. For example, a user will access a portal of a service provider and provide any initial authentication information (e.g., username and password). Then the user can use the device application to obtain a passcode generated by a method of the TFA SDK. The user will supply the service provider with the passcode, and the service provider will submit an authentication request with the passcode. The TFA service preferably replies with a synchronous response indicating the assessment of the passcode.

Figure 12:
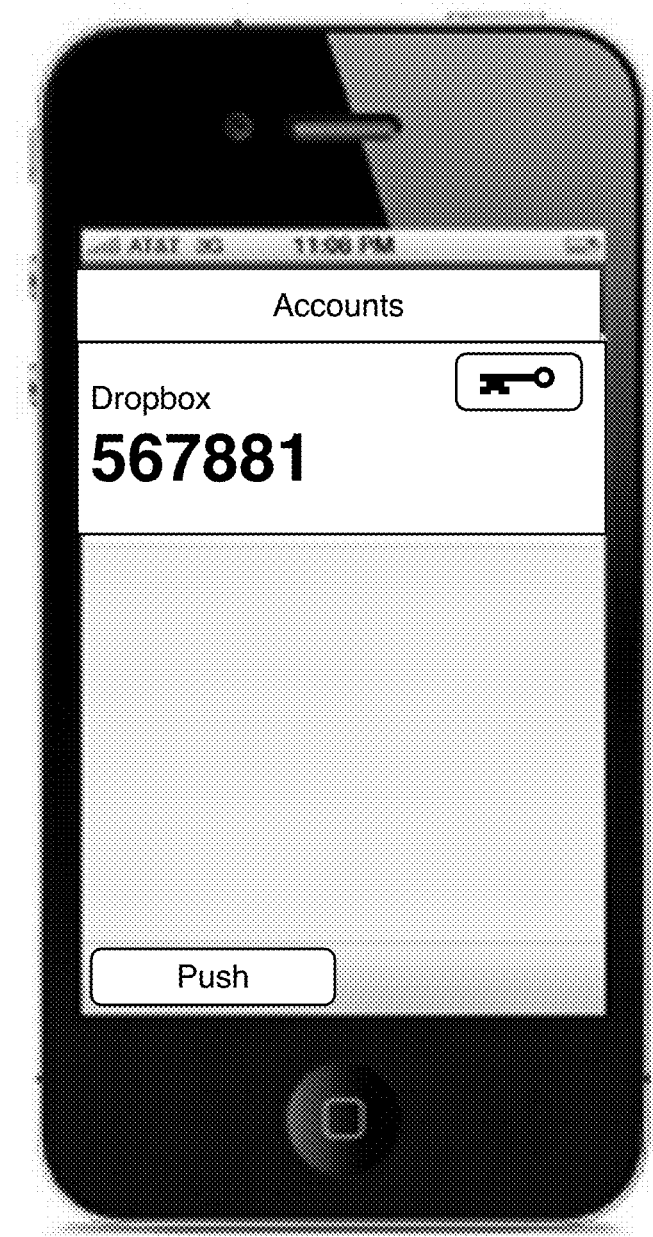
FIG. 12 is an exemplary screenshot of a device application view displaying a passcode.

Step S260, which includes generating a passcode in the device application, functions to create a single use passcode or otherwise unique token associated with the device application. The passcode is preferably a one time passcode generated using a technique of time-synchronized passwords, a cryptographic hash function, a pre-generated list of passwords stored on the device, or generated using any suitable technique. The passcodes generated are preferably uniquely identifiable as originating from the device application. The passcode generation approach may be seeded or configured during the enrollment of the device. For example, a one time password generation algorithm may be seeded during Step S130. The passcode is preferably generated by the TFA SDK and then communicated to the device application. The device application then preferably displays an interface to communicate the passcode as shown in FIG. 12.

Step S270, which includes validating the passcode at the TFA service, functions to verify or check the passcode supplied to the TFA service. The passcode is preferably verified for a particular device ID or other suitable identifier. As mentioned above, the generated passcode is preferably unique to the device, and the TFA service can preferably determine if the passcode is one that could have been generated by the device application. As mentioned above, the passcode and the device ID are preferably supplied in the authentication request. Upon assessing the validity of the passcode, the TFA service preferably sends a response validating or invalidating the passcode. The service provider can then enforce the result of the two-factor authentication in any suitable manner.

The system and methods of the preferred embodiment and variations thereof can be embodied and/or implemented at least in part as a machine configured to receive a computer-readable medium storing computer-readable instructions.

The instructions are preferably executed by computer-executable components preferably integrated with a two-factor authentication service and/or a two-factor authentication software development kit. The computer-readable medium can be stored on any suitable computer-readable media such as RAMs, ROMs, flash memory, EEPROMs, optical devices (CD or DVD), hard drives, floppy drives, or any suitable device. The computer-executable component is preferably a general or application specific processor, but any suitable dedicated hardware or hardware/firmware combination device can alternatively or additionally execute the instructions.

As a person skilled in the art will recognize from the previous detailed description and from the figures and claims, modifications and changes can be made to the preferred embodiments of the invention without departing from the scope of this invention defined in the following claims.

What is claimed is:

1. A method for providing secondary-factor authentication with a third party application, the method comprising:
   enrolling a device application instance of an account into a secondary-factor authentication service on behalf of a service provider comprising:
     at server of the secondary-factor authentication service, receiving a secondary factor of authentication enrollment request of an account, the request received from the service provider,
     the secondary-factor authentication service transmitting an activation code to the service provider, and
     at a database of the secondary-factor authentication service, pairing the device application instance with the account in response to device application processing of the activation code;
   receiving an authentication request identifying the account;
   transmitting an authentication request to the device application instance paired with the account;
   validating a response to the application request; and
   transmitting an assessment to the service provider;
   wherein the activation code is an activation universal resource identifier (URI); and wherein pairing the device application instance with the account through the activation code comprises pairing the device application instance with the account in response to the device application instance accessing the activation URI.

2. The method of claim 1, further comprising encoding the activation URI into a computer recognizable code and transmitting the computer recognizable code to the service provider.

3. The method of claim 1, further comprising providing a secondary-factor authentication software development kit; at the secondary-factor authentication software development kit, enrolling a coupled device application instance and processing an authentication request received from the secondary-factor authentication service.

4. The method of claim 3, further comprising configuring the service provider with software development kit credentials; and in the secondary-factor authentication software development kit, cryptographically securing the response to the authentication request.

5. The method of claim 3, further comprising providing a background device application, wherein the secondary-factor authentication software development kit is configured to direct authentication request processing operations to the background device application, and at the background device application, validating the authentication request and transmitting the response to the secondary-authentication service.

6. The method of claim 1, further comprising providing a secondary device application; receiving the authentication request at the secondary application from the device application; and at the secondary device application, validating the authentication request, rendering an interface according to customization directives of the device application, transmitting the response to the secondary-authentication service, and redirecting application focus in a modular operating system to the device application.

7. A method for using an authentication service comprising:
   enrolling a device application instance of an account into an authentication service on behalf of a service provider, the method comprising:
     at a server of the service platform, receiving an activation code of an authentication enrollment request,
     facilitating transfer of the activation code to the device application instance, and
     at the device application instance, communicating to the authentication service by processing the activation code, wherein processing the activation code successfully pairs the device application instance with an account on the authentication service;
   at the service platform, completing a primary authentication of the account and transmitting an authentication request to a factor authentication service, wherein the authentication request identifies the account;
   at the device application instance, receiving the authentication request;
   at the device application instance, validating the authentication;
   at the device application instance, rendering an authentication interface and receiving a user selected response option;
   at the device application, transmitting a response to the authentication service according to the user selected response option;
   at the service platform, receiving an assessment of the service providers;
   wherein the activation code is an activation universal resource identifier (URI); and wherein communicating to the authentication service comprises communicating device addressing information to the activation URI.

8. The method of claim 7, wherein at the device application, validating the authentication comprises validating the authentication request through a software development kit of the authentication service.

9. The method of claim 7, wherein the activation URI is a computer recognizable code; and further comprising at the device application, reading the computer recognizable code.

* * * * *